United States Patent [19]
Kolosov et al.

[11] 4,387,331
[45] Jun. 7, 1983

[54] CHARGE-DISCHARGE CURRENT STABILIZER FOR STORAGE BATTERIES

[76] Inventors: Ivan A. Kolosov, 1 Ogorodny tupik, 15, kv. 104; Petr Y. Titov, ulitsa Rabochaya, 28/30, kv. 54, both of Saratov, U.S.S.R.

[21] Appl. No.: 261,190

[22] PCT Filed: Sep. 28, 1979

[86] PCT No.: PCT/SU79100087
§ 371 Date: May 28, 1981
§ 102(e) Date: May 6, 1981

[87] PCT Pub. No.: WO81/00935
PCT Pub. Date: Apr. 2, 1981

[30] Foreign Application Priority Data
Aug. 1, 1977 [SU] U.S.S.R. .............................. 2513109

[51] Int. Cl.³ ............................................. H02J 7/04
[52] U.S. Cl. ..................................... 320/14; 323/255; 363/90
[58] Field of Search .......................... 320/5, 6, 8, 9, 14, 320/57, 59; 323/255, 256; 363/82, 90

[56] References Cited
U.S. PATENT DOCUMENTS
2,721,969 10/1955 Van Ryan ........................ 323/255
2,767,369 10/1956 Schindler ......................... 323/255
3,081,426 3/1963 Bakke ............................... 323/255

FOREIGN PATENT DOCUMENTS
514294 11/1939 United Kingdom ................ 363/90
264508 4/1970 U.S.S.R. .

Primary Examiner—William H. Beha, Jr.
Attorney, Agent, or Firm—Steinberg & Raskin

[57] ABSTRACT

A charge-discharge current stabilizer for storage batteries includes a rectifier having a control element and connected in series with a switch and storage batteries in a charge-discharge circuit. The stabilizer also includes a system to control the rectifier, having a current sensor in the form of an electromagnet with a movable armature. A transducer converting electric signals to pneumatic signals is mechanically coupled with the armature of the current sensor. A pneumatic drive is pneumatically coupled with, and controlled by, the transducer. The control element of the rectifier has a slide operatively associated with an operating member of the pneumatic drive.

2 Claims, 1 Drawing Figure

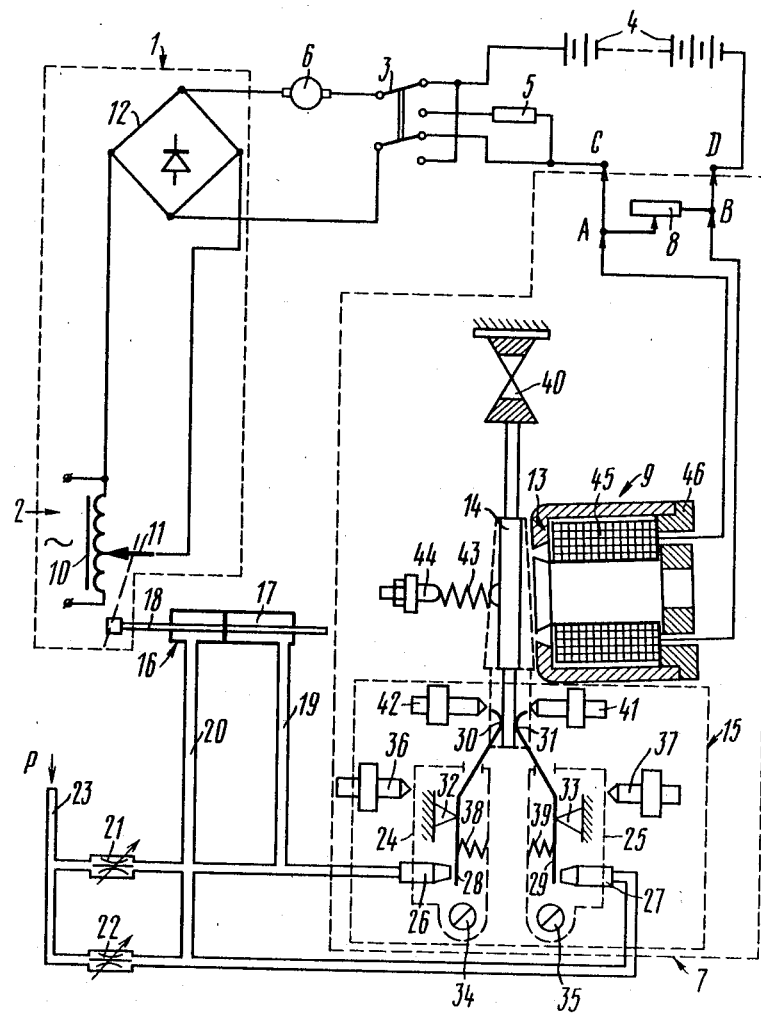

CHARGE-DISCHARGE CURRENT STABILIZER FOR STORAGE BATTERIES

BACKGROUND OF THE INVENTION

The present invention relates to supply circuits of electrical networks, and more particularly to charge-discharge current stabilizers for storage batteries.

The problem of stabilizing a charge-discharge current in the process of manufacturing storage batteries consists in that the majority of types of the up-to-date storage batteries are used under different operating conditions with the discharge current being changed by several orders within one cycle which brings about a necessity to test storage batteries under analogous operating conditions in the process of manufacturing thereof. It should be noted that during check tests each storage battery is discharged to the voltage of order of 1 V after which it is cut out of the circuit.

In such a case heavy current surges occur in the circuit, while in charging and discharging the storage batteries the current in the circuit changes monotonously. For this purpose it is necessary to insert into the charge-discharge circuit a stabilizer being substantially sensitive to monotonous variations of the current and quickly responding to heavy surges of the current in the circuit. Since the majority of stabilizers possess no such features, can operate within a narrow current range, are intricate in design and unreliable in operation, in the process of manufacturing use is generally made of rectifiers provided with manually-controlled slide-type current regulators.

Known in the art is an automatic device stabilizing the charge-discharge current for storage batteries (see the USSR Inventor's Certificate No. 164,354; published in Bulletin "Discoveries, Inventions, Industrial Designs and Trademarks" No. 15, 1964), comprising a transformer having an elongated core which mounts a stationary winding and a movable winding. Current stabilization in such a device is performed by an electrodynamic action of the transformer movable winding reactance which varies in magnitude with the winding being displaced over the core. The range of the stabilized current in this case may be set up within narrow limits only by way of changing the weight of the movable winding due to which such stabilizers are only used on the special stands for forming similar storage batteries under the same operating conditions. Moreover, such stabilizers have a low efficiency, as about 20% of electric energy is spent for producing the dynamic effect of stabilization.

Also known in the art are stabilizers having a pulse-phase system of rectifier electronic control. The closest to the proposed apparatus is a charge-discharge current stabilizer for storage batteries (see USSR Inventor's Certificate No. 372,604; published in Bulletin "Discoveries, Inventions, Industrial Designs and Trademarks" No. 13, 1973), comprising a rectifier with a control element, connected in series with a switch and storage batteries into a charge-discharge circuit, and a rectifier control system having a current setter and a current sensor incorporated into the charge-discharge circuit.

The rectifier control system in this stabilizer is essentially a pulse-phase system having a control transistor, a DC amplifier, filters, a reference voltage source and a thyristor rectifier.

The rectifier control pulse-phase system fails to provide a sufficiently wide range of the stabilized current inasmuch as the stabilization limits are restricted by the performances of electronic control elements. Therefore, manufacturers of storage batteries should have a great variety of stands for testing the storage batteries under different operating conditions with respect to the current.

SUMMARY OF THE INVENTION

The principle object of the invention is to provide a charge-discharge current stabilizer for storage batteries, whose rectifier control system is so designed as to make it possible to stabilize values of the current within a wide range, thereby allowing the creation of universal stands for forming and check testing of storage batteries.

This is accomplished by a charge-discharge current stabilizer for storage batteries, comprising a rectifier having a control element and connected in series with a switch and storage batteries into a charge-discharge circuit, a rectifier control system has a current setter and a current sensor incorporated into the charge-discharge circuit. In accordance with the invention, the current sensor is in the form of an electromagnet with a moving armature, and the rectifier control system comprises a transducer converting electric signals in pneumatic signals and mechanically coupled with the moving armature of the current sensor, and a pneumatic drive pneumatically coupled with the transducer and controlled by it, the control element having a slide operatively associated with an operating member of the pneumatic drive.

Preferably, the transducer converting electric signals to pneumatic signals, is provided with two pneumatic devices of a nozzle-flapper type, each of which has a normally closed nozzle, whereas the flappers are made in the form of levers with their arms opposite to the nozzles interacting with the electromagnet armature towards each other.

The charge-discharge current stabilizer for storage batteries provides stabilization of current within a wide range with a high accuracy.

The charge-discharge stabilizer operates reliably and features sufficient sensitivity both with the current changing monotonously and at heavy surges of the current in the circuit. Due to this, it becomes possible to develop universal stands for testing storage batteries, which in turn reduces the areas occupied by test equipment and also reduces production costs of storage batteries.

BRIEF DESCRIPTION OF THE DRAWINGS

For a fuller understanding of the invention, reference is had to the following description, taken in connection with the accompanying drawings, in which the single FIGURE is a block diagram of an embodiment of the charge-discharge current stabilizer for storage batteries of the invention.

DESCRIPTION OF PREFERRED EMBODIMENTS

A charge-discharge current stabilizer for storage batteries comprises a rectifier 1 having a control element 2 and connected in series with a switch 3 and storage batteries 4 in a charge-discharge circuit. The switch 3 serves to change the circuit from charging the storage batteries 4 to discharging thereof and vice versa. At the moment of discharge a load 5 is inserted in the circuit.

The charge-discharge circuit also comprises an ammeter 6 to register the value of the charge-discharge current.

The stabilizer also includes a system 7 to control the rectifier 1, comprising a current setter 8 and a current sensor 9. The current sensor 9 is connected with the current setter 8 at points A, B and to the charge-discharge circuit at points C, D.

In the stabilizer embodiment discussed herein the control element 2 is made in the form of an autotransformer 10 having a slide 11 and connected with a thyristor bridge 12 of the rectifier 1.

The control element may be made in the form of a transformer having a movable coil, or a slide-wire rheostat, or any other control means.

The current sensor 9 is made in the form of an electromagnet 13 with a moving armature 14.

In addition to the current setter 8 and the current sensor 9, the system 7 to control the rectifier 1 comprises a transducer 15 converting electric signals at pneumatic signals, mechanically coupled with the armature 14 of the current sensor 9, and a pneumatic drive 16 pneumatically coupled with the transducer 15 and controlled by it. The pneumatic drive 16 has a pneumatic cylinder 17 whose rod 18 is connected with the slide 11. The pneumatic cylinder 17 is connected by means of pipe-lines 19,20 through adjustable fluidic resistors 21, 22 with a pipe-line 23 connected to a compressed gas system (not shown in the drawing) in which a pressure P is maintained. The pneumatic drive may also be made in the form of a membrane, bellows or any other pneumatically-operated device.

The slide 11 of the control element 2 is operatively associated with the operating member (in the particular embodiment with the rod 18) of the pneumatic drive 16.

The transducer 15 is provided with two pneumatic devices 24, 25 of a nozzle-flapper type. Each of the devices 24, 25 has a normally-closed nozzle 26, 27, respectively and a flapper 28, 29, respectively, in the form of a lever. Arms 30, 31 of the flappers 28, 29, opposite to the nozzles 26, 27 mechanically interact with the armature 14 of the electromagnet 13 towards each other.

The nozzles 26 and 27 are connected to the pipelines 19 and 20, respectively, and to the pneumatic cylinder 17.

The flappers 28, 29 swing relative to respective supports 32, 33 fixedly mounted in casings of the devices 24, 25. The positions of the casings on their axles 34 and 35, respectively, may be adjusted by screws 36 and 37, respectively.

The flappers 28, 29 are pressed by springs 38 and 39, respectively, to working end faces of the nozzles 26, 27.

The armature 14 is fixedly attached to a suspension 40 and the extreme positions thereof, indicated in the drawing by dashed lines, are limited by screws 41, 42. In the direction opposite to the electromagnet 13 the armature 14 is acted upon by a spring 43 whose force is adjusted by a screw 44.

The electromagnet 13 has a coil 45 accommodated in a housing 46 of magnetically soft steel. The armature 14 is made of the same material to remove residual magnetization of magnetic circuit elements of the electromagnet 13. The current setter 8 in the embodiment described herein is in the form of an adjustable resistor inserted in a charge-discharge circuit of rectified current. In the case of heavy charging currents it is expedient to use as a current setter a current instrument transformer with its primary winding connected in series with the bridge.

The stabilizer employing such a circuit should be adjusted as follows. With the autotransformer 10 switched out of the circuit compressed air is fed to the pipe-line 23 to build up a pressure ranging from 1.5 to 2 atm. With the spring 43 removed and the devices 24, 25 taken apart the armature 14 is set plumb and secured in position by the screws 41, 42. An air flow meter, e.g. a rotameter, is placed into the pipe-line 23. A uniform flow through the fluidic resistors 21, 22 is set against the rotameter by opening the respective nozzles 26, 27 in turn. In so doing, the fluidic resistors 21, 22 should be set approximately to the middle position of their active action. The casings of the devices 24 and 25 are brought to the armature 14 by their respective screws 36 and 37 to contact the arms 30, 31 of the levers 28, 29, respectively. Then, the rotation of the screws 36, 37 is continued and it is necessary to open the nozzles 26, 27 of each device 24, 25 to ensure equal flow against the rotameter within 10–15% of their full opening. The armature 14 is then released and its extreme positions are adjusted with the help of the screws 41, 42 so that in these positions the nozzles 26, 27 be fully open. The rod 18 should be also displaced into its extreme positions and stop with the armature 14 taking its middle position. At slightest deviations of the armature 14 to either side from the middle position the rod 18 should begin to move smoothly at approximately equal speed. The spring 43 and the electromagnet 13 are set so that the armature 14 contacts the electromagnet 13 in one of its extreme positions. The coil 45 of the electromagnet 13 is connected into an adjustment circuit (not shown in the drawing), the operating voltage is set (mean value by the characteristic of the electromagnet 13) and the spring 43 is tensioned by the screw 44 to place the armature 14 in the middle position. The adjustment range of the resistor of the current setter 8 should provide setting of the operating voltage of the electromagnet 14 with the slide 11 being in the end positions during adjustment. Since the current stabilization in the proposed circuit is performed at zero compensation of the signal, the adjustment described can be made on a special stand.

With resistance of the resistor being changed the slide 11 is displaced and consequently a new range of the stabilized current is set. The resistor may be made replaceable for different stabilization ranges.

The current sensor 9 and transducer 15 arranged in a single casing function as a comparator unit for making measurements by a compensation method. The transducer 15 may be adjusted on a special stand by the manufacturer and may be used as a component part of the stabilizer with seals applied. The pneumatic cylinder 17 with the fluidic resistors 21, 22 is preferably set with the rectifier 1 for several ranges of stabilized currents, such as, for example, currents from 0 to 5 A, from 0 to 10 A, from 5 to 50 A, and so on. Thus, said units may be used to make up a universal stand for forming and check testing the storage batteries 4 with a wide range of stabilized currents.

The charge-discharge current stabilizer for storage batteries operates in the following way.

In a stable state the current in the coil 45 of the electromagnet 13 corresponds to the rated value of the given transducer 15 (within 20–30 mA). The armature 14 is in the middle position, the flappers 28, 29 somewhat open (10-15%) the nozzles 26, 27 providing uniform outflow of the gas from both chambers of the cylinder 17 and balanced state of the rod 18. At a slightest variation of the current in the charge-discharge circuit of the storage batteries 4 due to variation of their internal resistance or due to variation of the voltage in the electricity supply network, the current in the coil 45 varies, the magnetic field of the electromagnet 13 varies proportionally to the current variation, the armature 14 moves in one or other direction changing the open section of the nozzles 26, 27.

Considered herein as an example is a case when the current in the charge-discharge circuit of the storage batteries 4 decreases. The armature 14 in such a case moves leftwards, the gas outflow from the left-hand nozzle 26 increases whereas from the right-hand nozzle 27 decreases. The pressure in the left-hand chamber of the pneumatic cylinder 17 rises and in the right-hand chamber falls, which causes the rod 18 to move to the right and to increase the current in the charge-discharge circuit until the disturbed balance is restored.

In the case of a sharp variation of the current such as, for example, due to switching one of the storage batteries 4 out of the discharge circuit, the armature 14 suddenly goes to the extreme right position, the flapper 28 completely closes the nozzle 26 whereas the right-hand nozzle 27 completely opens. The rod 18 quickly moves to the left decreasing the current in the circuit of the storage batteries 4. With the armature 14 approaching its middle position the speed of movement of the rod 18 decreases due to variation of the velocity of the gas outflow from the nozzles 26, 27, and a gradual restoration of the balanced state occurs. Sensitivity and speed of response of the system can be adjusted within a wide range with the help of the fluidic resistors 21, 22. Variation of the compressed gas pressure in the line produces no influence on the stabilizer parameters since the gas is simultaneously fed to the both chambers of the pneumatic cylinder 17 and acts on the rod 18 from the opposite sides.

The system 7 to control the rectifier 1 when used together with the control element 2 provided with the slide 11 coupled with the pneumatic drive 16 ensures high accuracy of stabilization (about 1 to 1.5%) both with the current in the circuit changing monotonously and suddenly.

The present invention can be used for forming and testing storage batteries in the process of manufacturing thereof.

The invention can also be used for automation of control of various production processes as a transducer for converting electric signals of sensors into mechanical movements of controls.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A charge-discharge current stabilizer for storage batteries, said current stabilizer having a rectifier with a control element, said rectifier being connected in series with a switch and storage batteries in a charge-discharge circuit, and a rectifier control system having a current setter included in said charge-discharge circuit, said charge-discharge current stabilizer comprising
    a current sensor included in said rectifier control system and having an electromagnet with a moving armature;
    a transducer further included in said rectifier control system for converting electric signals to pneumatic signals, said transducer being of nozzle-flapper type having a pair of nozzles and being mechanically coupled to the armature of said current sensor;
    a compressed gas system;
    adjustable fluidic resistors; and
    a pneumatic drive pneumatically coupled to said compressed gas system and to the nozzles of said transducer via said adjustable fluidic resistors and controlled by said transducer, said pneumatic drive having an operating member, said control element of said rectifier having a slide operatively connected to said operating member of said pneumatic drive.

2. A charge-discharge current stabilizer for storage batteries, said current stabilizer having a rectifier with a control element, said rectifier being connected in series with a switch and storage batteries in a charge-discharge circuit, and a rectifier control system having a current setter included in said charge-discharge circuit, said charge-discharge current stabilizer comprising
    a current sensor included in said rectifier control system and having an electromagnet with a moving armature;
    a transducer further included in said rectifier control system for converting electric signals to pneumatic signals, said transducer being mechanically coupled to the armature of said current sensor, said transducer having a pair of pneumatic devices of nozzle-flapper type, each of which has a normally-closed nozzle, and a pair of flappers in the form of levers having arms opposite the corresponding nozzles thereof interacting toward each other mechanically with said armature of said electromagnet; and
    a pneumatic drive pneumatically coupled to said transducer and controlled by said transducer, said pneumatic drive having an operating member, said control element of said rectifier having a slide operatively associated with said operating member of said pneumatic drive.

* * * * *